United States Patent
Ma et al.

(10) Patent No.: US 10,942,776 B2
(45) Date of Patent: Mar. 9, 2021

(54) DYNAMIC RESOURCE ALLOCATION FOR APPLICATION CONTAINERS

(71) Applicant: Accenture Global Solutions Limited, Dublin (IE)

(72) Inventors: Guo Ma, Beijing (CN); Guanyi Sun, Beijing (CN); Bin Xie, Beijing (CN)

(73) Assignee: Accenture Global Solutions Limited, Dublin (IE)

( * ) Notice: Subject to any disclaimer, the term of this patent is extended or adjusted under 35 U.S.C. 154(b) by 47 days.

(21) Appl. No.: 16/334,907

(22) PCT Filed: Sep. 21, 2016

(86) PCT No.: PCT/CN2016/099603
§ 371 (c)(1),
(2) Date: Mar. 20, 2019

(87) PCT Pub. No.: WO2018/053717
PCT Pub. Date: Mar. 29, 2018

(65) Prior Publication Data
US 2019/0286486 A1 Sep. 19, 2019

(51) Int. Cl.
*G06F 9/50* (2006.01)
*G06F 9/52* (2006.01)
*G06N 20/00* (2019.01)

(52) U.S. Cl.
CPC .............. *G06F 9/5027* (2013.01); *G06F 9/50* (2013.01); *G06F 9/5016* (2013.01); *G06F 9/5077* (2013.01); *G06F 9/524* (2013.01); *G06N 20/00* (2019.01); *G06F 9/505* (2013.01); *G06F 2209/505* (2013.01)

(58) Field of Classification Search
None
See application file for complete search history.

(56) References Cited

U.S. PATENT DOCUMENTS 8,214,829 B2   7/2012 Neogi et al.
8,495,648 B1*  7/2013 Brandwine ............ G06F 9/505
                                           709/226
(Continued)

FOREIGN PATENT DOCUMENTS

CN      102004671 A      4/2011
CN      102004671 A      4/2011
(Continued)

OTHER PUBLICATIONS

International Preliminary Report on Patentability and Written Opinion for PCT Application PCT/CN2016/099603 dated Mar. 28, 2019 (5 pp.).

(Continued)

*Primary Examiner* — Isaac T Tecklu
(74) *Attorney, Agent, or Firm* — Brinks Gilson & Lione

(57) ABSTRACT

Cloud service based on container technology provides a lightweight, portable, but robust architecture for deploying service applications. Service volume and resource requirement for a typical modern-day application may fluctuate dramatically in time. A dynamic resource allocation scheme based on machine learning algorithms and executed by the cloud for applications deployed as independent containers allows for efficient resource usage and improvement of quality of service for the applications.

16 Claims, 13 Drawing Sheets

(56) References Cited

U.S. PATENT DOCUMENTS

| | | | | |
|---|---|---|---|---|
| 9,356,883 | B1* | 5/2016 | Borthakur | H04L 41/5025 |
| 9,595,054 | B2* | 3/2017 | Jain | G06Q 30/04 |
| 9,882,836 | B2* | 1/2018 | Baughman | H04L 47/823 |
| 2004/0181370 | A1 | 9/2004 | Froehlich et al. | |
| 2006/0259621 | A1* | 11/2006 | Ranganathan | H04L 67/1002 709/226 |
| 2009/0300173 | A1* | 12/2009 | Bakman | H04L 41/147 709/224 |
| 2010/0011002 | A1* | 1/2010 | Gerovac | H04L 67/06 707/E17.009 |
| 2011/0022434 | A1 | 1/2011 | Sun et al. | |
| 2012/0330711 | A1* | 12/2012 | Jain | G06Q 30/04 705/7.23 |
| 2014/0016650 | A1* | 1/2014 | Chai | H04L 45/02 370/431 |
| 2014/0032761 | A1* | 1/2014 | Beveridge | G06F 9/45533 709/226 |
| 2014/0289412 | A1* | 9/2014 | Doddavula | H04L 41/5003 709/226 |
| 2015/0254108 | A1* | 9/2015 | Kurtzman | G06F 9/5016 718/104 |
| 2016/0301624 | A1* | 10/2016 | Gonzalez | G06F 9/5083 |
| 2016/0378563 | A1* | 12/2016 | Gaurav | G06F 9/5077 718/1 |
| 2017/0126506 | A1* | 5/2017 | Padala | H04L 43/08 |
| 2020/0169602 | A1* | 5/2020 | Aronovich | G06F 9/5083 |

FOREIGN PATENT DOCUMENTS

| | | |
|---|---|---|
| CN | 103875210 A | 6/2014 |
| CN | 105320559 A | 2/2016 |
| WO | WO 2016/040699 A1 | 3/2016 |

OTHER PUBLICATIONS

Extended Search Report of corresponding European patent application No. 16916456.3, dated Jan. 9, 2020, 10 pages.

International Search Report and Written Opinion for corresponding PCT Application PCT/CN2016/099603 dated Jun. 28, 2017.

* cited by examiner

US 10,942,776 B2

DYNAMIC RESOURCE ALLOCATION FOR APPLICATION CONTAINERS

RELATED PATENT APPLICATION

This application claims priority benefit and is a national stage of International PCT Patent Application No. PCT/CN2016/099603, entitled DYNAMIC RESOURCE ALLOCATION FOR APPLICATION CONTAINERS, filed with the Chinese Patent Office on Sep. 21, 2016, the entire contents of which is incorporated herein by reference.

TECHNICAL FIELD

This application concerns dynamic computer resource allocation.

BACKGROUND

Service applications may each run as multiple independent instances on a cluster of computers. Each instance of a service application may be encapsulated in a "container" running on one of the cluster of computers. Each container of a service application may include the service application and all of its dependencies such as the entire software stack of libraries for the service application. Each computer of the cluster of computers may include a set of hardware resources and run a host operating system. Each container may be allocated, for execution purposes, a subset of hardware resources of the computer on which the container is provisioned. Improvements in controlling resource allocation for applications and their containers will drive their further adoption and increase resource usage efficiency.

DETAILED DESCRIPTION

Infrastructure as a service (IaaS) is a form of cloud service in which a cloud service provider maintains a set of hardware resources that provides a computing environment for clients. A client of an IaaS provider may be a service provider itself and provide its users with services of various characteristics. For example, a client may be a web portal providing e-commerce and other services to a large number of users. As another example, a client of an IaaS provider may be a photo or video sharing/processing/streaming application that provides users with services that are data intensive. As yet another example, a client of an IaaS provider may be a scientific or engineering modeling application that provides processing intensive services to few specialty users.

Each of these client applications may be hosted and run in the cloud as multiple independent instances of containers and allocated certain amount of resources. The resource requirement for a client application may be in a first form of a number of containers that need to be instantiated, and in a second form of an amount of supporting hardware resources, e.g., processors and memories, for each instantiated container. Because these applications are of such different characteristics in terms of, e.g., processing intensity, data intensity, and user volume, their computing resource requirements in both of the two forms for achieving a certain level of quality of service (QoS) and user satisfaction are likely to be dramatically different. In addition, the resource requirement for a particular client application may vary in time. For example, the user volume of a web portal may fluctuate between weekdays and weekends, between daytimes and night-times, and may be correlated with certain events. Dynamic and predictive resource allocation in both of the two forms for client applications is thus a key to reducing over allocation and waste of resources on one hand, and reducing under-allocation and loss of QoS for clients on the other hand.

Figure 1:
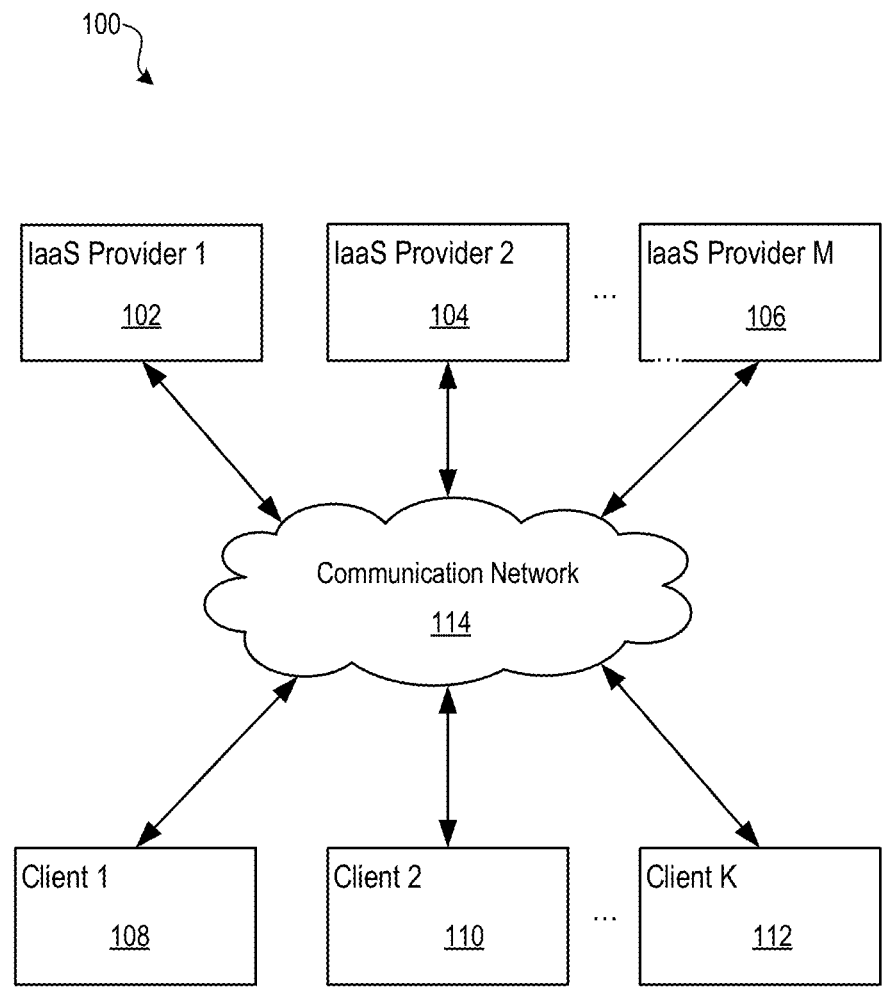
FIG. 1 shows an example architecture for infrastructure as a service (IaaS)

FIG. 1 shows an architectural diagram of an exemplary computing system for providing IaaS to clients. Clients 108, 110, and 112 may obtain IaaS from various IaaS providers such as 102, 104, and 106. Each client may need IaaS for hosting various types of applications. Each IaaS provider may own computing resources suitable for certain types of applications. Thus, a client may request services from different IaaS providers for different types of applications. Each client may communicate with the IaaS providers via a communication network 114. The communication network 114 may be of any kind. For example, the communication network 114 may include the Internet or other types of computer networks or telecommunication networks, either wired or wireless. The communication network 114 may include a combination of various types of computer networks. Clients 108, 110, and 112 may request services from, deploy applications to, and obtain application data (such as run-time data) from the IaaS providers via the communication network 114 using any client devices including but not limited to desktop computers, laptop computers, mobile phones, tablets, tablet computers, and Personal Digital Assistants (PDAs). Clients 108, 110, and 112 may use any type of software installed on client devices, e.g., client applications provided by IaaS providers, to access and communicate with the IaaS providers.

Figure 2:
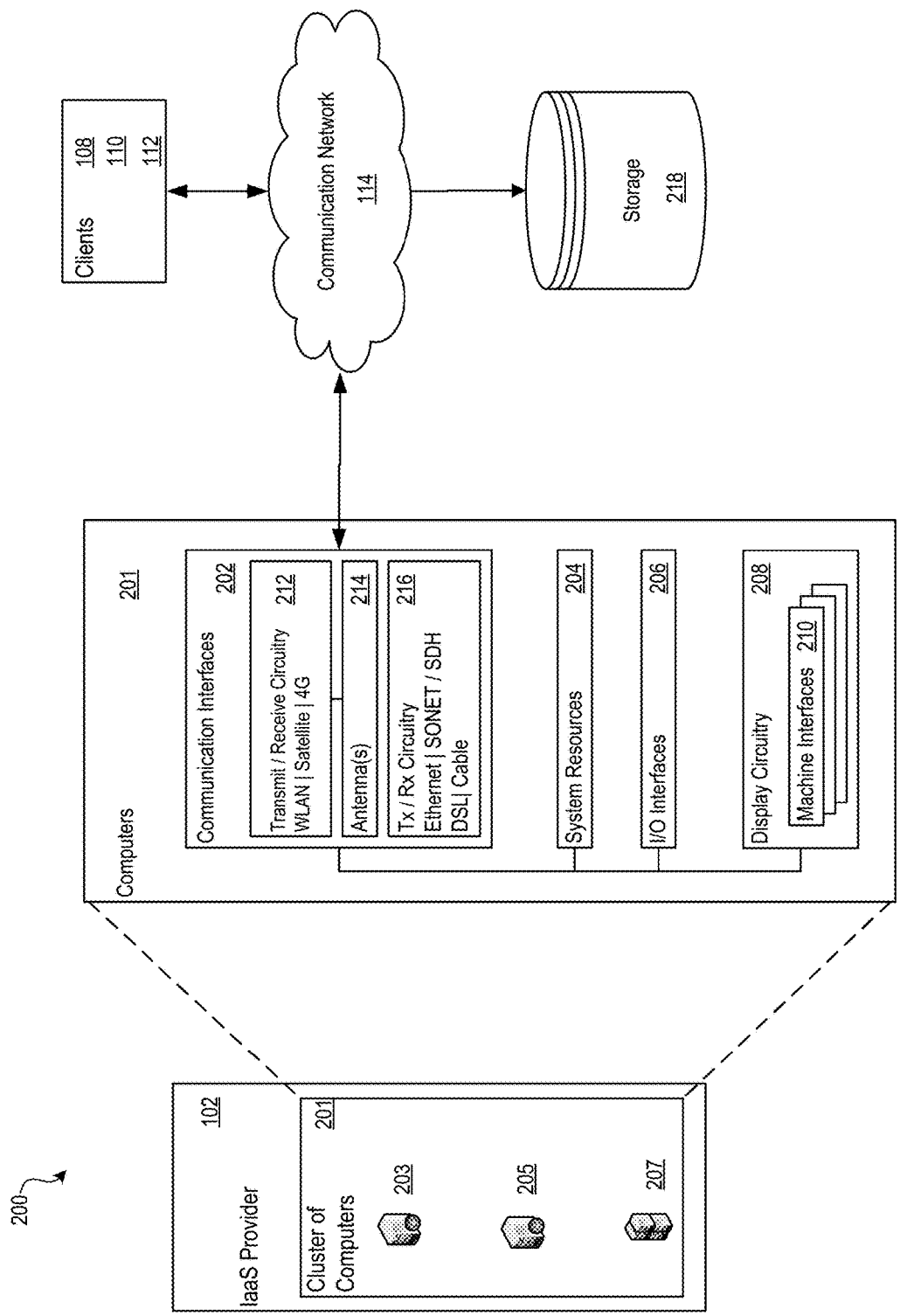
FIG. 2 shows a block diagram of a cluster of computers for providing IaaS.

FIG. 2 shows, by example, an implementation of computing system 200 for a typical IaaS provider. For example, one of the IaaS providers of FIG. 1, such as the IaaS provider 102, may maintain a cluster of computers 201 including, for example, computers 203, 205, and 207. The cluster of computers 201, may include communication interfaces 202, system resources 204, input/output (I/O) interfaces 206, and display circuitry 208 that generates machine interfaces 210 locally or for remote displays, e.g., in a web browser running on a local or remote computer. The machine interfaces 210 and the I/O interfaces 206 may include GUIs, touch sensitive displays, voice or facial recognition inputs, buttons, switches, speakers and other user interface elements. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit/receive circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), synchronous optical network (SONET), or other protocol.

The cluster of computers 201 may be in communication with clients 108, 110, and/or 112 via the communication network 114. Computers 201 may further be in communication with storage 218, either directly or via the communication network 114. The storage 218 may comprise any type of storage media, including but not limited to magnetic or optical disks, solid state media, and magnetic tapes. The storage 218 may be organized as a distributed storage network. The storage 218 may alternatively be organized as a centralized storage area network.

Figure 3:
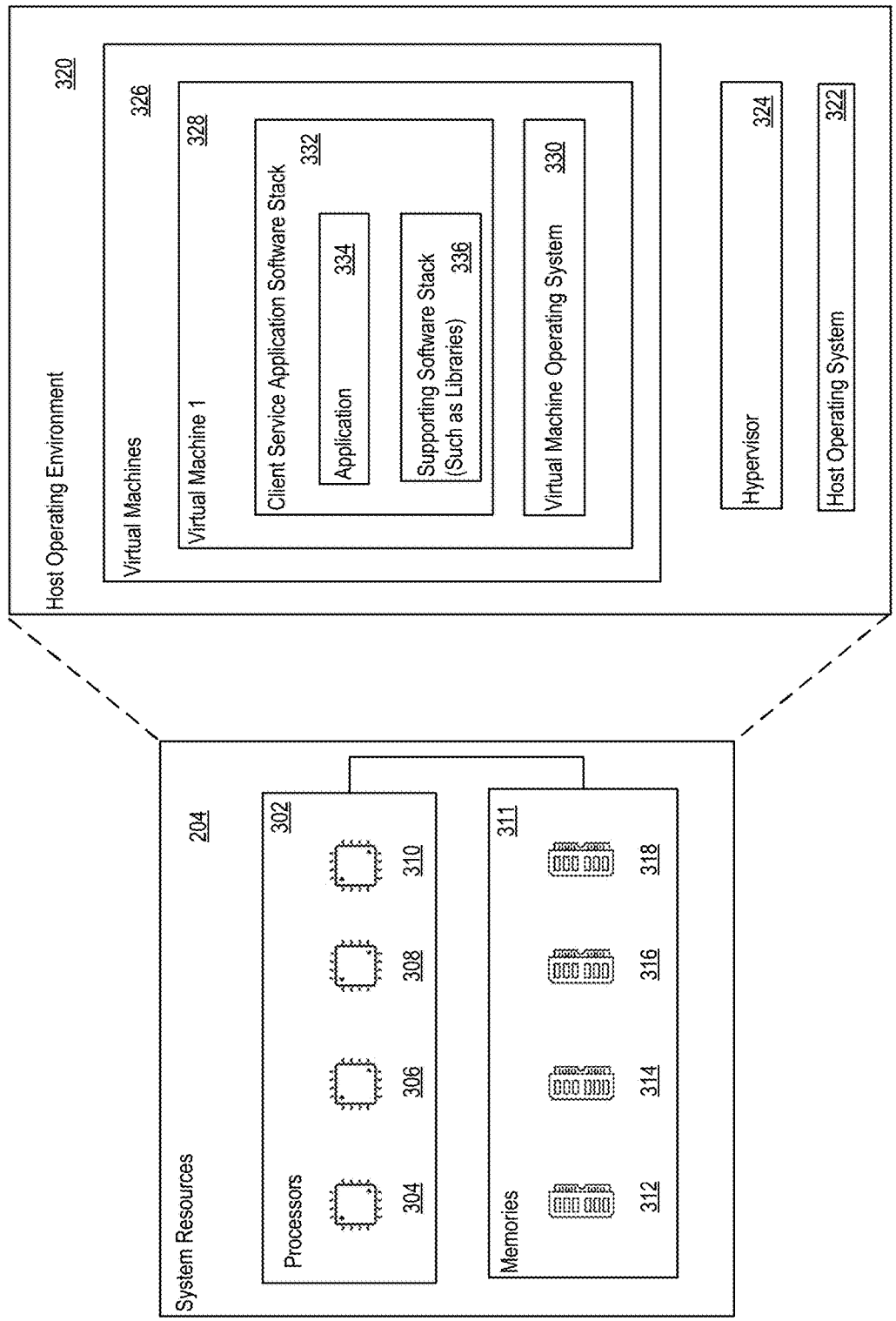
FIG. 3 shows an implementation of virtual machines on one of the cluster of computers of FIG. 2.

As shown by FIG. 3, the system resources 204 of the cluster of computers 201 may include hardware, software, firmware, or other circuitry and resources in any combination. The system resources 204, for example, may include instruction processors 302, such as 304, 306, 308 and 310. The system resources 204 may further include memories 311, such as 312, 314, 316, and 318. The system resources 204 may be implemented, for example, as one or more systems on a chip (SoC), application specific integrated circuits (ASIC), microprocessors, in combination with solid state memories, random access memories, discrete analog and digital circuits, and other circuitry. The system resources 204 provide the basic platform for implementation of any desired functionality in computers 201. The memories 211 store, for example, instructions that the processors 302 may execute to carry out desired functionality for providing IaaS to clients. While each computer within the cluster of computers 201 may each maintain its own processors, memories or other system resources, FIG. 3 provides an aggregated view of all system resources of the cluster of computers 201.

As further illustrated in FIG. 3, the system resources 204 may be configured to provide IaaS to clients based on an architecture containing virtual machines. Specifically, a host operating environment 320 may be established in each computer of the cluster of computers for supporting virtual machines 326. The host operating environment may be supported by a host operating system 322. A hypervisor, such as VMware lines of hypervisor products from EMC Corporation, may be further installed in each computer to provide support for virtual machines. A client of IaaS may request one or more virtual machines 328 each allocated a subset of the system resources. The client may treat and configure each of the allocated virtual machine as a bare virtual computer by installing, for each virtual machine, a client operating system 330 and entire application software stacks 332, including the applications 334, and all their dependences 336, such as all software libraries needed to run the applications (note that FIG. 3 only illustrates one application for simplicity). Each virtual machine may be instantiated independently. Because the configuration of each virtual machine includes the entire client operating system that typically occupies a large storage space, requires extensive memory space, and is separate from and in addition to the host operating system, virtual machine architecture may be wasteful in terms of system resources. For the same reason, instantiation of images of a virtual machine for supporting higher service volume for a client is time consuming. Thus, real-time instantiation of virtual machines in response to fluctuating client resource requirement may be impractical.

Figure 4:
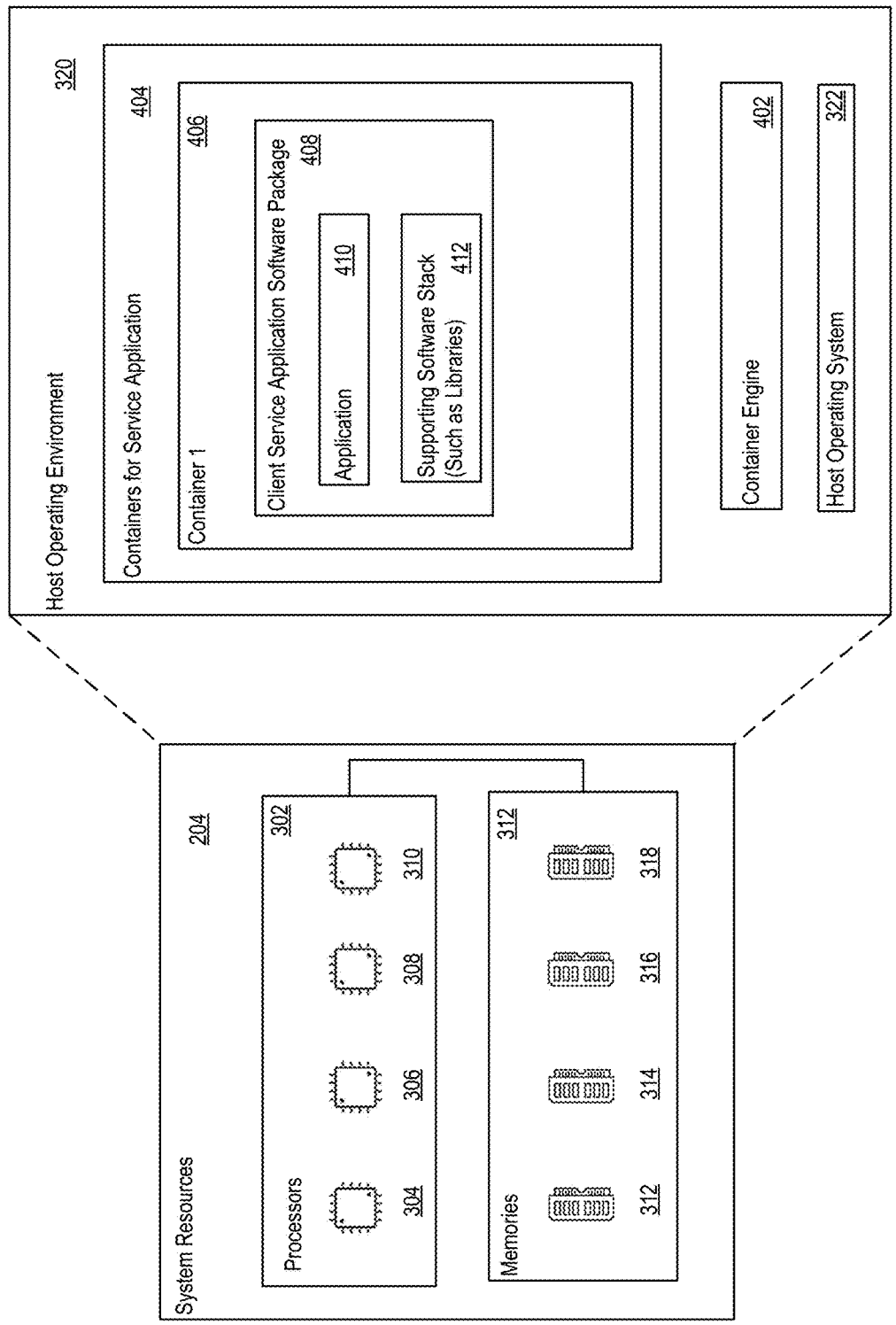
FIG. 4 shows an implementation of application containers on one of the cluster of computers of FIG. 2.

Alternatively, the system resources 204 may be configured to provide IaaS to clients based on containers, as illustrated in FIG. 4. Specifically, a host operating environment 320 may be established in each computer of the cluster of computers for supporting containers 404. Similar to the architecture based on virtual machines, the host operating environment 320 may include the host operating system 322. A container engine 402 may be installed in the host operating environment to support instantiation of containers. In the container architecture of FIG. 4, the client who needs to deploy a service application does not need to request for virtual machines. Rather, the client may request a number of containers 404 for deploying the service application. Compared to the architecture based on virtual machines, the client using IaaS supporting the container architecture does not need to install any client operating system. It only needs to package the application 410 and all its dependencies such as its software stack of libraries 412. The packaged application 408 may be instantiated as multiple independent instances, each instance being a running container, such as 406. All containers running on a computer of the cluster of computers may share the same host operating system and its kernel.

In comparison with the virtual machine architecture, the container architecture is lightweight, resource-conserving, and robust. Because they are lightweight, containers may be instantiated very quickly and efficiently. Thus, as the service volume and system resource needs for a client application increase in real-time, new containers may be instantiated as needed to meet client demand. Likewise, when service volume of the application drops, excess containers may be removed quickly and efficiently with their user traffic redistributed to the remaining containers of the application.

Figure 5:
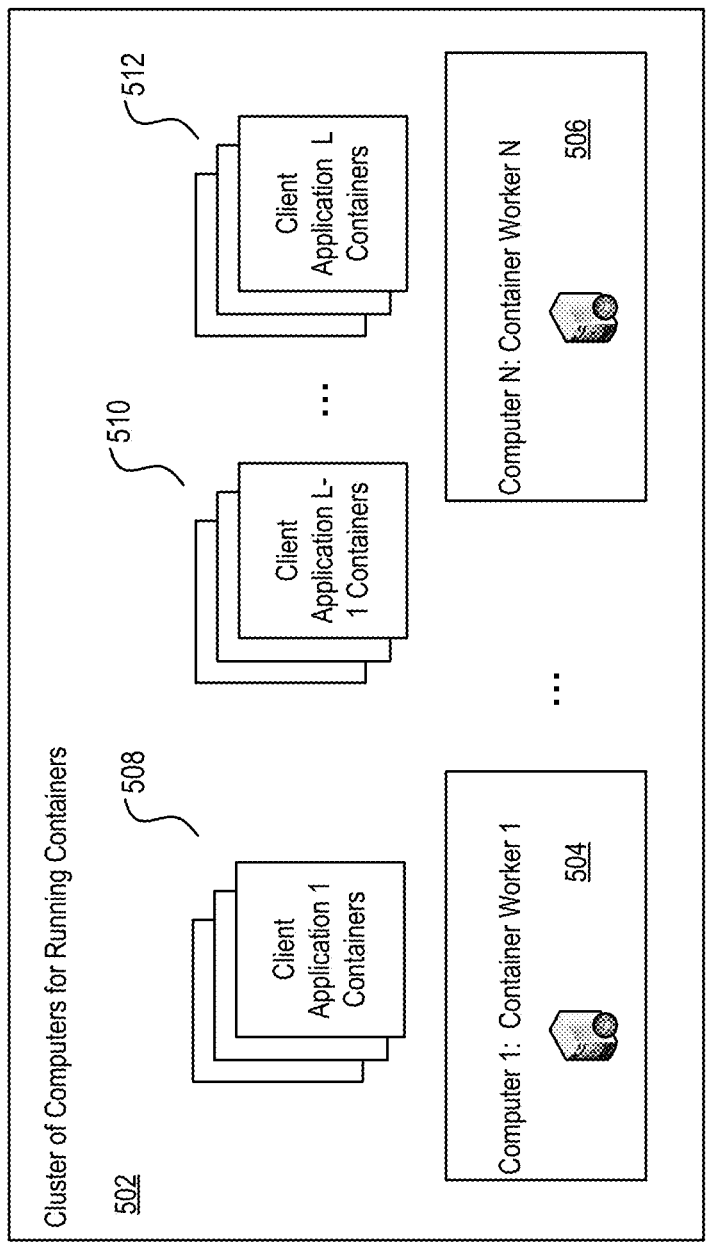
FIG. 5 shows an implementation of running containers of various applications on the cluster of computers of FIG. 2.

The relationship between client applications, containers, and the cluster of computers of IaaS is further illustrated in 502 of FIG. 5. FIG. 5 shows various computers of the cluster of computers, such as computers 504 and 506. These computers may also be referred to as container workers. These computers or container workers are labeled for illustration from container worker 1 to container worker N. The container workers provide IaaS to a number of client applications, such as applications 508, 510, and 512. These client applications are labeled for illustration from client application 1 to client application L. A single client may deploy more than one client application. For example, the client application 508 and client application 510 may be deployed by a single client, whereas the client application 512 may be deployed by another different IaaS client.

Each client application may run as one or more independent instances of containers, as shown by the stacks of blocks in 508, 510 and 512. The containers of the client applications may be instantiated in the cluster of container workers. Containers of a particular application may be instantiated on multiple container workers within the cluster of container workers. In general, a container may run on any one of the container workers. Containers of the same client application do not necessarily need to run on the same container worker. Thus, independent containers of one application may be instantiated in multiple container workers. Each container worker of the cluster of container workers may run one or more containers of the same application or different applications. Likewise, each container worker may run containers of the same client or different clients. To simplify the management of containers, each container preferably runs on one of the container workers rather than runs across multiple container workers. For example, the containers of the client application 1, 508 of FIG. 5, may be instantiated on any one container worker or subset of container workers among the container workers 1 through N.

Client applications such as applications 508, 510, and 512 may be deployed for very different purposes and thus of different nature. Some of these client applications may be intended for providing services to users of the corresponding clients. The client applications may be of different characteristics in terms of, e.g., processing intensity, data intensity, and user volume. For example, a client application may be a web portal providing e-commerce and other services to a large number of users. As another example, a client may be a photo or video sharing, processing, or streaming application that provides users with services that are data intensive. As yet another example, a client of an IaaS provider may be a scientific or engineering modeling application that provides processing-intensive services to few specialty users.

Allocation of system resources to a client application in the container architecture for achieving a certain level of quality of service (QoS) and user satisfaction for the client application may be implemented as both determining a number of containers to be instantiated for the client application and resource allocation for each of the instantiated containers in terms of e.g., processor and memory allocation. Even though different combinations of the two forms of resource allocation, i.e., the number of containers and resource allocation for each container, may be equivalent in terms of total allocation of system resources for a client application (e.g., in terms of total allocated CPU and memory resources), each of these two forms of allocation may be critical by itself. For example, for client applications that serve a large number of user requests but are computationally light for each user may be more efficiently deployed as a large number of containers each taking a relatively small amount of CPU and memory resources. On the other hand, a scientific or engineering modeling application that provides processing-intensive services to few specialty users may be better implemented as few containers each allocated a significant amount of CPU and memory resources.

In addition, the resource requirements for a particular client application may vary in time. For example, user volume for a web portal may trend up slowly over time as the web portal gain popularity. Further, on a shorter time scale, the user volume of a web portal may fluctuate between weekdays and weekends, between daytimes and night-times, between different days of a month, and may be correlated with certain events. Thus, the system resource allocated to an application may need to be dynamically adjusted in real-time for keeping up with QoS and user satisfaction while reducing over-allocation. Further, the dynamical adjustment of resource allocation may preferably be predictive and proactive. In other words, resource allocation may be adjusted in anticipation of changes in service volume rather than being an adaptive or responsive adjustment after changes in service volume have already occurred and been detected. Such a post-problem solution may be unsatisfactory because user experience may have already been compromised before any adjustment of resource allocation is timely made.

In one implementation, a client, before deploying an application in the cloud, may first determine an initial system resource requirement in the two forms described above. The client may then send a request for service prescribing the system resource requirement to the IaaS provider. The IaaS provider may then instantiate the prescribed number of containers and each allocated with the prescribed amount system resources. In order to guarantee QoS and reduce over-allocation over time, system resource allocation for the application is adjusted in real-time and in a predictive manner. The prediction of resource requirement for a future time may be based on models trained by various machine learning algorithms, such as random forest regression algorithms and s support vector machine algorithms.

Figure 6:
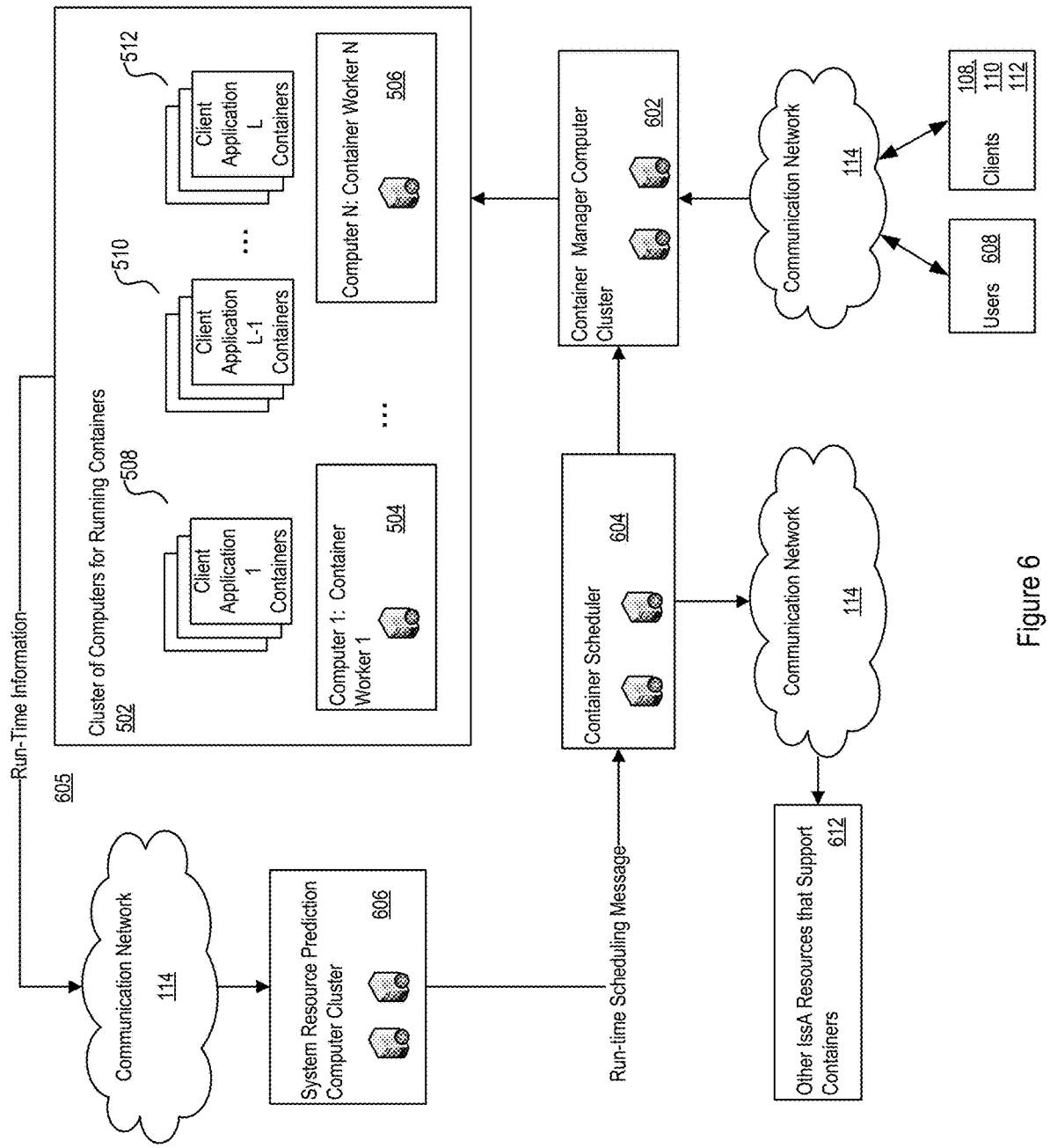
FIG. 6 is a block diagram of a container scheduling and resource allocation system for a cluster of computers.

An example of this implementation in an IaaS system is illustrated in FIG. 6. The system includes the cluster of computers or containers workers 502 for deploying client applications. The system further includes a container manager computer cluster 602, a container scheduler 604, and a computer cluster 606 for predicting system resource requirement for client applications. The container manager computer cluster 602 may be in communication with the scheduler 604 and the cluster of container workers 502. The scheduler 604 may be in communication with the system resource prediction computer cluster 606 and the container manager computer cluster 602. The system resource prediction computer cluster 606 may further be in communication with the container worker cluster 502. The communication between various computers described above may be via dedicated communication interface or may be via generic communication network 114. FIG. 6 shows as an example that the communication between the container workers and the system resource prediction computer cluster may be via the communication network 114.

The system resource prediction computer cluster 606, also referred to as the predictor, is responsible for predicting resource requirement for client applications at a future time based on machine learning algorithms. The predictor 606 may contain one or more computers. These computers may be dedicated to the function of predictive modeling of resource requirement. Alternatively, the resource prediction function may be encapsulated in software running on computers in which predictive modeling is only part of their overall function. Resource requirements for each application at the future time may be predicted separately. Correspondingly, the predictor may implement predictive models where each model is developed for one client application based on machine learning of training data associated the one client application.

The predictor 606 may obtain and record run-time information 605 from the container workers over time and use the collected and processed run-time information as training/ testing data for the machine learning algorithms. In some implementations, the input data may be split into training data and verification (or testing) data.

The run-time information 605 may include but is not limited to CPU usage, memory usage, user volume, and service volume (e.g., number of user requests). The information collected may be associated with timestamps (including information such as time of the day, day of the week, day of the month, etc.). Looking ahead briefly to FIG. 7, that figure illustrates that the run-time information may be reported from the container workers 1 to N to the predictor 606 (the box with dotted sides). The run-time information may be communicated from the container workers to the predictor in the form of run-time data messages, as shown by 716, 718, and 720. Each message may contain run-time information described above for a container, associated timestamps, and identifier that identifies the container. The run-time data messages may be placed in the run-time message queues 702.

The run-time data message queues 702 may comprise multiple separate queues from queue 1 to queue L, each for one client application. Run-time data messages associated with containers of each client application may be queued or aggregated as a group. Aggregation of run-time data at application level over all containers of a client application provides an appropriate overall resource usage assessment of the client application at a particular time. In one implementation, the run-time data messages may be identified by containers and they may be aggregated into groups each for a client application according to a correspondence between containers and applications. Such correspondence may be obtained by the predictor as special messages from, for example, the container workers. Alternatively, the run-time data messages communicated from the container workers may have already been identified by application and in such a case, the run-time data messages may be directly queued or aggregated according to application identifiers contained in the run-time data messages.

Figure 7:
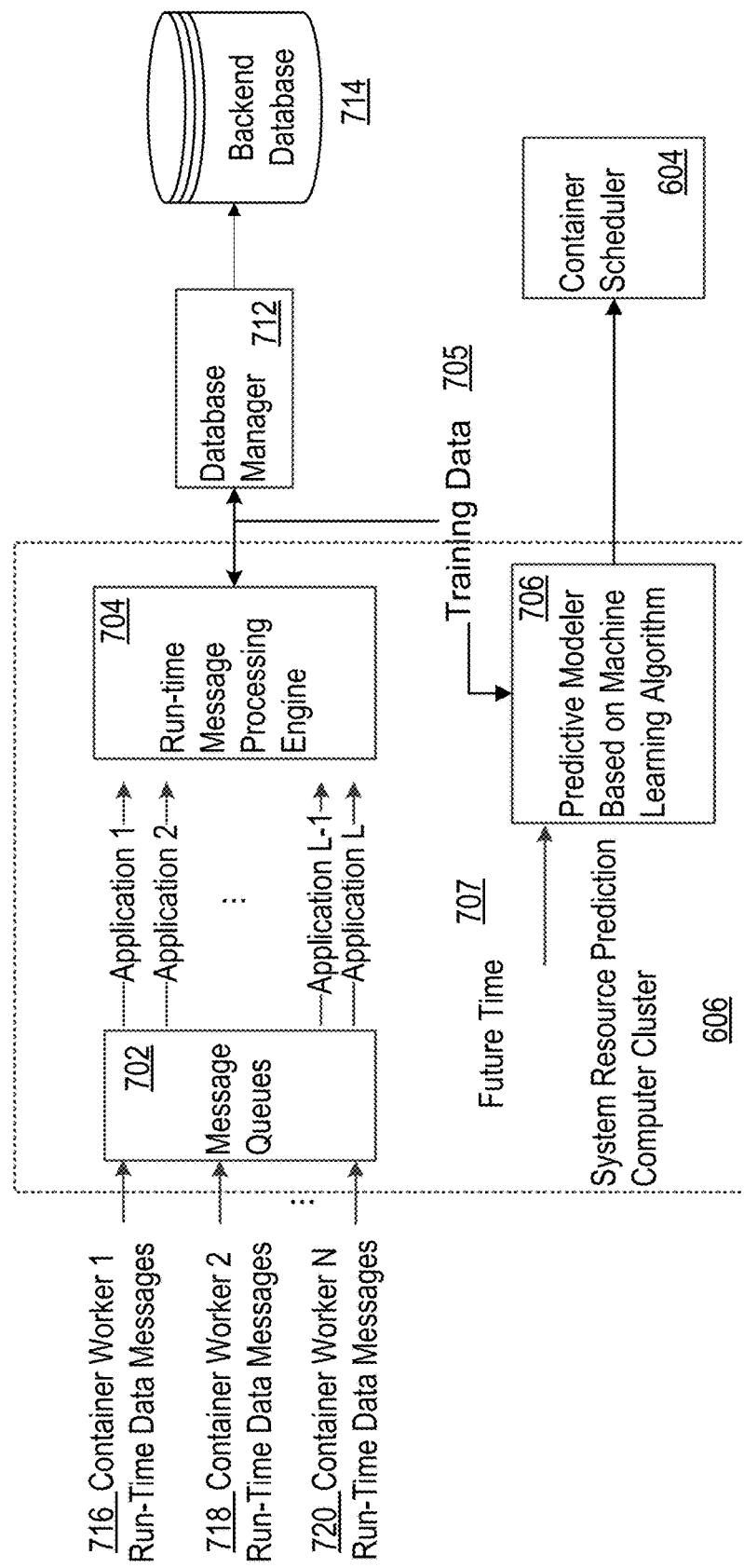
FIG. 7 shows a flow diagram of logic that the system may implement for predicting and scheduling resource allocation for containers.

Run-time data messages aggregated according to client applications 1 to L may then be processed by a run-time message processing engine 704 of FIG. 7 to extract and format data into forms that may be used in predictive modeling based on machine learning algorithms. The run-time message processing engine 704 may be based on, for example, spark streaming processing. The processed data may then be stored in a backend database 714 via a database manager 712. The processed run-time data for each application may be used as training data 705 and input into a predictive modeler 706 based on machine learning algorithms for developing predictive models each for one client application. The predicted resource requirement for each application at the future time 707 may be provided by the predictive modeler to the container scheduler 604 (FIG. 6).

The processed run-time data that may be used as training data 705 for each client application may include but is not limited to number of user requests in a given time interval, the number of CPU cores and memory size required by each user request, user request timestamps and duration, etc. These data provide information about user behavior at particular times and may be used to train the predictive model for client applications based on machine learning algorithms.

Figure 8:
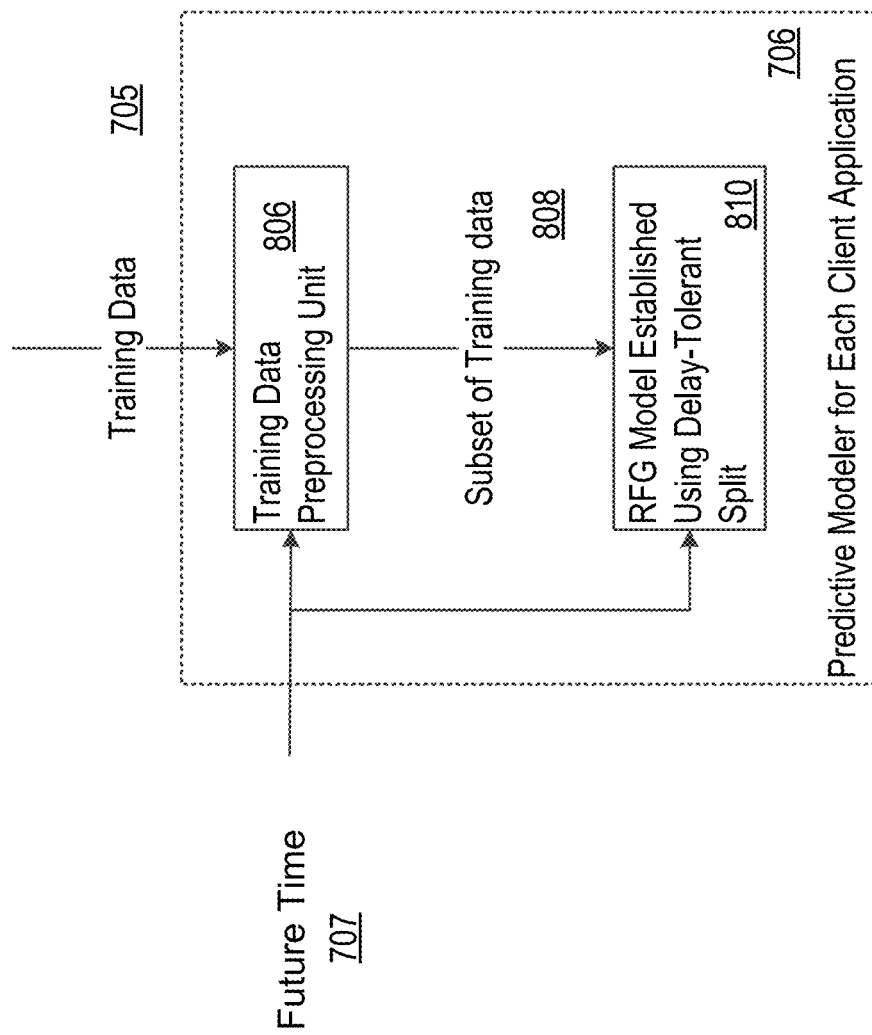
FIG. 8 is a flow diagram of logic that the system may implement for resource allocation based on machine learning.

FIG. 8 illustrates an example implementation of the predictive modeler 706 of FIG. 7. In this implementation, run-time data for a particular client application may be input into the predictive modeler as training data 705. The future time 707 (including time, day of wee, day of month, for example) for which user behavior and the corresponding resource requirement is to be predicted may be specified as another input to the predictive modeler 706. The predictive modeler 706 may include a unit 806 for preprocessing the training data and obtaining a subset of the training data 808. The subset of training data may be selected from the training data 705 by the preprocessing unit 806 based on the future time 707, as will be described in more detail below. The subset of training data 808 may be used as actual training data for a predictive model 810 for the particular client application. The predictive model 810 maybe obtained based on, for example, a Random Forest Regression (RFR) algorithm, or a Support Vector Machine (SVM) algorithm. In particular, the predictive model 810 may be based on an RFR algorithm specially modified and adapted for predicting user behaviors in IaaS context, as will be described in more detail below.

Figure 9:
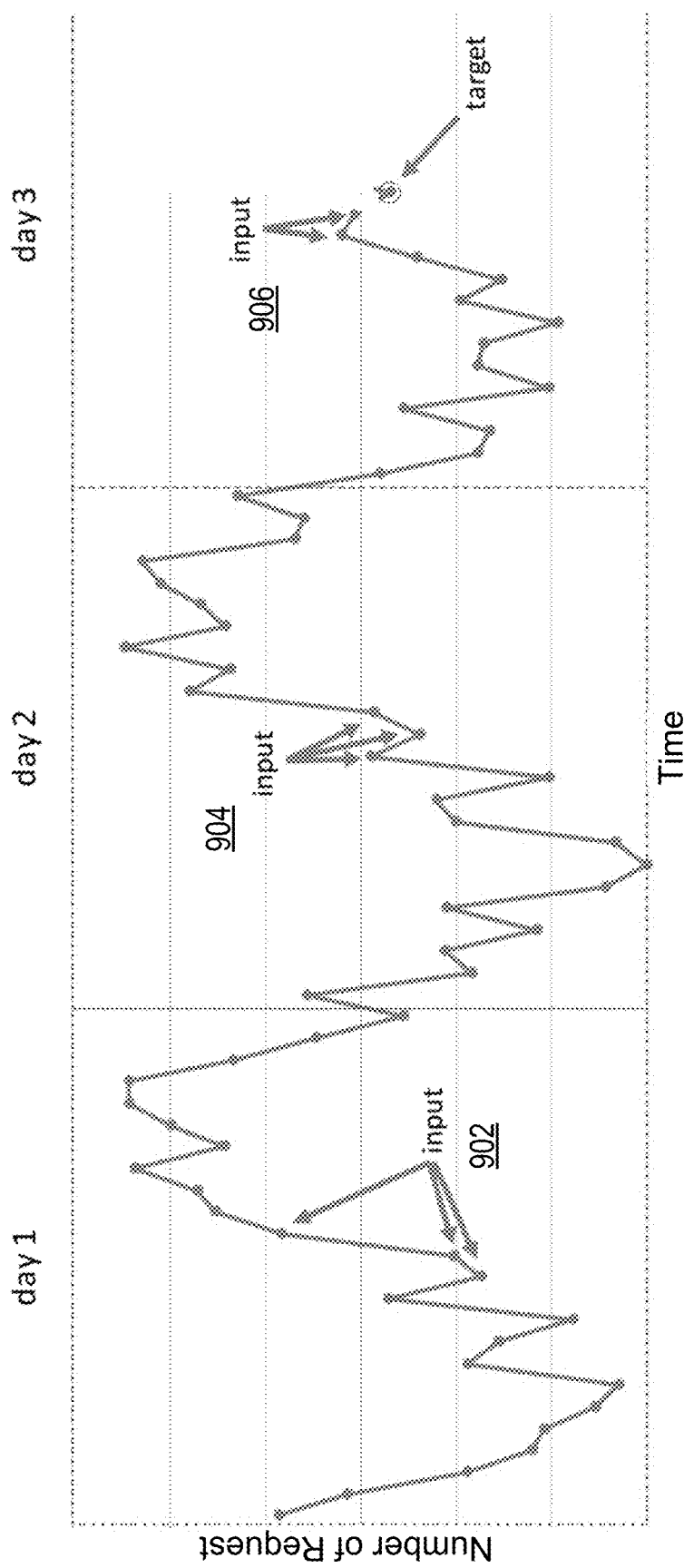
FIG. 9 shows an exemplary quasi-periodic service volume data for an application as a function of time.

The selection of the subset of training data by the training data preprocessing unit 806 may be based on the future time 707. In one embodiment, only training data having timestamps that are potentially correlated with future time may be selected and included in the subset of training data 808. User behavior may be more accurately predicted using correlated data. For example, run-time data from the same time on weekdays may be strongly correlated. User behavior may be similar during a particular time of a weekend, or around a particular annual event. Further, similar time of the same day of the week may also be correlated. For example, user behaviors at 8 pm Saturday night may be similar to user behaviors at 9 pm Saturday night. Thus, the quasi-periodic nature of service volume of a client application (in terms of either number of user request, CPU usage, memory usage, and so on) may be taken into consideration in selecting more relevant subset of the run-time data for training the predictor. Uncorrelated data in machine learning usually causes overfilling and add inaccuracy to prediction from the trained model. For example, FIG. 9 shows a typical quasi-periodic relationship between number of user request for a client application and time. Run-time data at the times indicated by the arrows labeled as "input" may be selected as training data for developing a model for predicting a number of user requests at a time indicated by the arrow labeled as "target" during day 3. These selected times may include, for example, similar or identical times 902 during day 1, similar or identical times 904 during day 2, and similar times 906 before the "target" during day 3.

Figure 10:
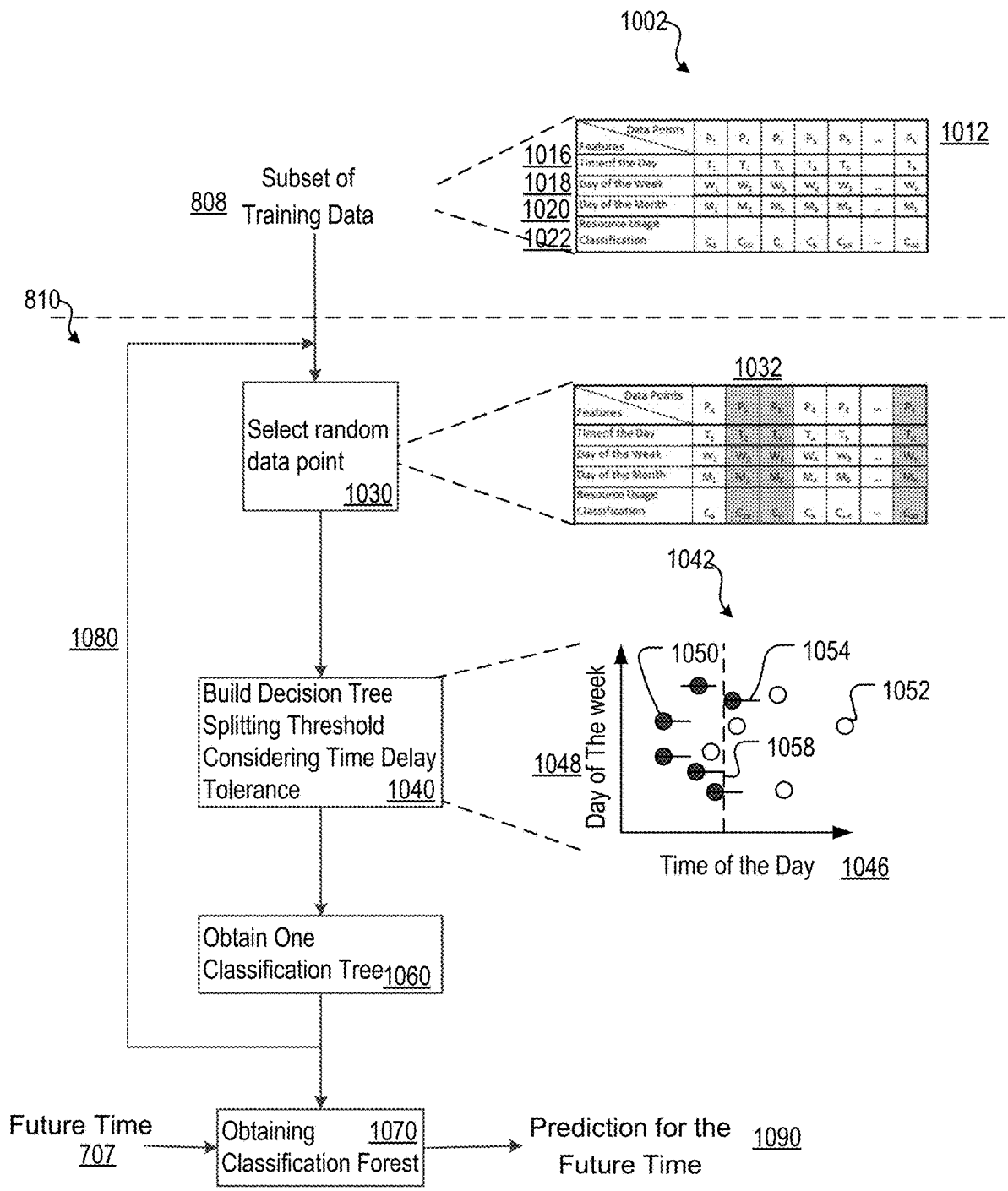
FIG. 10 is a flow diagram of logic that the system may implement for predicting resource requirement for an application based on a model developed using a modified random forest regression algorithm.

The selected subset of training data 808 based on the future time for which resource requirement is to be predicted may now be used as training data in developing a predictive model 810 of FIG. 8 for the client application based on a modified RFR algorithm. An exemplary implementation is shown in FIG. 10. In a nutshell, the subset of training data 808 is input in the predictive model 810. Random data points are selected at block 1030 for developing a classification tree of resource usage according to various features (such as time of the day, day of the week, and day of the month). In obtaining a classification tree at step 1060, splitting threshold for the features may be determined at block 1040 considering a time delay tolerance with respect to the time of the day feature. A random forest comprising of multiple classification trees may be obtained at block 1070 by repeating the same steps above using different sets of random data points from the training data, as shown by the loop arrow 1080. The future time 707 including various classification features may then be input into random forest 1070 and the resource usage is predictively classified in each tree. The resource usage classification having the highest votes among the classifications trees may be determined as the predicted resource usage classification 1090.

In more detail, an example of subset of training data 808 containing various features and resource usage data is shown in table 1002. The training data points $P_1, P_2, \ldots, P_K$ are indicated by 1012 and each corresponds to a set of features labeled as "time of the day" 1016, "day of the week" 1018, and "day of the month" 1020. The resource usage 1022 may be classified into various predefined levels or classifications $C_1, C_2, \ldots C_Q$. The number of levels or classifications, O, may be determined by desired resolution for the predictor in terms of resource allocation. Each data point is classified according to the predefined levels for resource usage. The resource usage can be any one or combination of run-time data, including but not limited to number of user requests, CPU usage, and memory usage.

Like any other typical RFR algorithm, a forest including a large number classification trees may be established from the subset of training data 808. A classification tree may be developed by randomly selected data points as shown in block 1030. For example, table 1032 shows that data points $P_2, P_3,$ and $P_K$ may be randomly selected for establishing one particular classification tree.

The process of building classification tree is shown in block 1040 and the corresponding illustration 1042 of FIG. 10. For simplicity, only two features of the training data, e.g., "day of the week" and "time of the day" are illustrated as 1048 and 1046, along the horizontal and vertical axis, respectively. For further simplicity, only two classifications, e.g., high usage or low usage, are assumed for the resource usage data. The two classifications are represented by filed circle such as 1050 (referred to as the first classification), and empty circle such as 1052 (referred to as the second classification), respectively. In developing a classification tree, a classification splitting threshold corresponding to the two features may be determined to optimally split the data by classification. In the example of 1042, data of the first classification mostly concentrate on the left side of a vertical line 1058 whereas data of the second classification are mostly concentrated on the right side of the vertical line 1058, with minor mixes between the two classifications in the middle. A vertical line 1050 may thus be the classification splitting threshold for achieving optimal splitting of the first and second classifications.

A classification tree may thus be established. Any combination of input features of "day of the week" and "time of the day" may then be predictively classified according to this tree: if the time of the day is smaller than the splitting threshold 1058, then the resource usage for this input feature combination may be predicted to be of the first resource usage classification whereas if the time of the day equals to or is greater than the splitting classification threshold 1058, then the resource usage for this input feature combination may be predicted to be of the second resource usage classification.

In practice, there may be more than two features and there may be more than two resource usage classifications (see table 1032 of FIG. 10). Thus, the data may need to be split in hierarchical way, resulting in a multi-level classification tree having one classification splitting threshold at each hierarchical level. Further, for more optimal splitting of the data according to the features, classification splitting threshold more complex than a simple line such as 1058 may be used. Depending on the distribution of the data for various classifications, a classification splitting threshold such as 1058 may be of any orientation determined to achieve optimal splitting of data of various classifications. For example, if data of the first classification concentrate more on the upper half of 1042 but data of the second classification concentrate more on the lower half of 1042, a classification slitting threshold line that is horizontal rather than vertical may be the optimal classification splitting threshold.

In determining an optimal classification splitting threshold at any level of a hierarchical classification tree, the RFR algorithm may search for a splitting threshold that optimizes an information gain. The information gain, for example, may be an amount of decrease in entropy of the information before and after the splitting.

In calculating the information gain, the RFR algorithm may be modified to include a delay tolerance with respect to, for example, the time of the day feature. The delay tolerance may be introduced for the rationale that, in the particular context of resource allocation, it is acceptable to predict increase of usage volume slightly ahead of time because increase resource allocation ahead of actual uptick in service volume helps QoS without unduly wasting system resources. Thus, assuming the first classification represented by filed circle in 1042 is a higher resource usage classification than the classification represented by the empty circles, a delay tolerance of time of the day may be introduced to data points of the first classification. This delay tolerance may be represented by the tolerance bars such as 1054 added to the filled circles. When determining the splitting threshold, the bar is considered when optimizing the information gain. For example, with the delay tolerance bars in 1041, the splitting threshold may be determined to be shifted towards the right side (compared to the situation where no delay tolerance is considered) when optimizing the information gain because the bars weigh the filed circles, particularly the ones in the regions with mixed filed and empty circles, more towards the right side. Shifting the classification splitting threshold to the right side would produce a splitting of the first and second classifications with better information gain. As such, a time of the day in the future in the mixed region that would be classified into a lower usage classification without considering the delay tolerance may be classified into the higher usage classification instead.

Although the implementation of machine learning algorithm above is based on RFR, other machine learning algorithms such as SVM may be chosen for predicting resource allocation. The preprocessing of the training data and the modification for adapting to delay tolerance may also be implemented in other chosen machine learning algorithms along the lines discussed above.

Returning now to FIG. 6, once the resource usage for a client application at a future time, such as number of user request, CPU usage, and memory usage, is predicted by the random forest developed from the modified RFR predictor above or in FIG. 6, predicted resource usage may be communicated to the container scheduler 604 of FIG. 6. The container scheduler 604 may be responsible for converting the resource usage output of the predictor into system resource allocation including a number of containers to be instantiated and CPU/memory allocation for each container. Alternatively, only a number of containers to be added or removed and CPU/memory allocation adjustment are determined by the scheduler.

Staying now with FIG. 6, the container manager computer cluster 602 (also referred as container manager) may comprise one or more computers. These computers may be dedicated to the function of container management. Alternatively, container management function may be encapsulated in software running on the computers where container management is only part of their overall function. The container manager may be in communication with the container scheduler to obtain resource allocation for each application (in terms of number of containers and the amount of system resources allocated to each container). The container manager may further be in communication the container workers for carrying out container management. Further, the container manger may be in communication with clients 108, 110 and 112, as well as users of the client 608. In one implementation, the container manager may function as a gateway for users in accessing the containers of the client applications running on the container workers. The container may additionally function as a gateway for clients to making service request and uploading executable images of applications.

Figure 11:
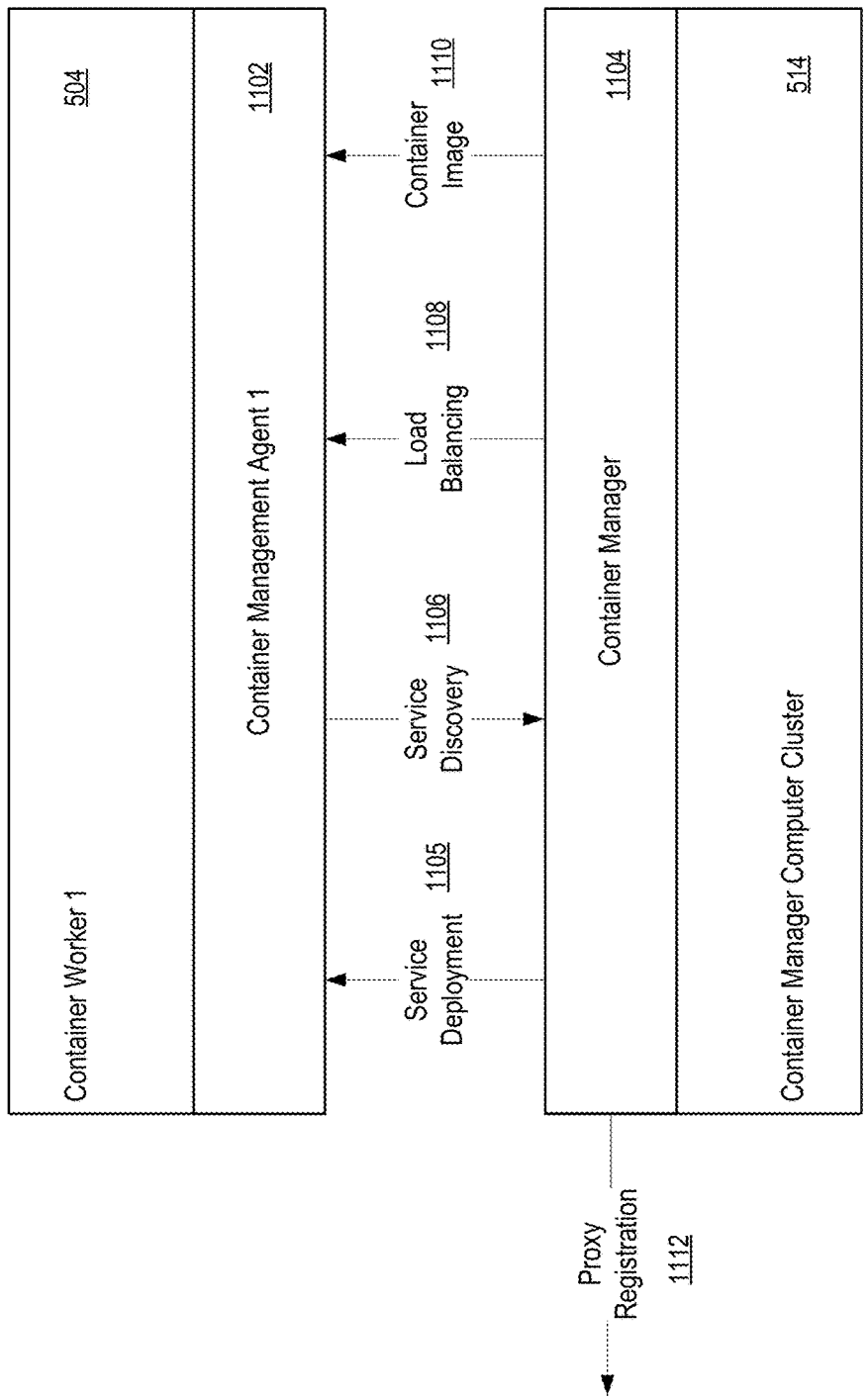
FIG. 11 shows an implementation of container management agent and container manager.

FIG. 11 illustrates, as an example, the interactions between the container manager and the container workers. For example, a container management agent 702 may be installed on each of the container workers as an interface between the container workers and the container manager. The function the container manager may include but is not limited to service deployment 1105, proxy registration 1112, service discovery 1106, load balancing 1108, and container image management 1110. Specifically, the container manager may be responsible for deploying and instantiating containers onto the container workers. The container manager may deploy the containers according to the resource allocation information obtained from the container scheduler. The container manager may examine the resource usage among the container workers and determine for each container its host container worker and instantiate the container using the corresponding application image uploaded by the client and managed by the container manager. Correspondingly, the container image management function of the container manager relates to obtaining executable images of applications developed by clients, storing the images, and, delivering the images to appropriate container workers when instantiating containers of the applications.

Further, because the container manager may be a gateway to user traffic for all clients, client domain names or the name address (such as a web site address) for accessing services by users of the clients may be registered in, e.g., DNS servers, as pointing to the container manager. In other words, the container manager may act as proxy for the clients. The container manager thus carries out the function of proxy registration 1112 when a request from a client for service is accepted and the domain name for the client application is given.

Furthermore, the container manager may keep track of the communication channels to the deployed containers using some logic channel representation internal to the container manager. The container management agent 1102 running on the container workers may maintain a mapping between logic channels used by the container manager and physical channels (such as network ports) used in container workers. While the logic channels maintained by the container manager may not change, the physical channels associated with an existing container may change as the container management agent in the container worker rearrange resources among containers, particularly when new container need to be instantiated. The service discovery function 1106 of the container manager may be responsible for keeping track of such changes in the container workers so that a user request may be dispatched to the correct ports.

The container manager may further perform the function of load balancing 708. Specifically, because the container manager may function as a gateway for users of applications to access the applications, it may also be convenient for the container manager to be responsible for dispatching user traffic for an application to the containers of the application and keeping the user volume among containers of the application balanced.

Finally and returning to FIG. 6 again, the container scheduler 604 may further be in communication with other IaaS platforms 612 via the communication network 114. In the situation where the system resources of the cluster of container workers 502 is temporarily inadequate for maintaining QoS due to service surges, the container scheduler 604 may send requests to one of the other IaaS platforms for temporarily instantiating some containers there. Other channels may be provided for delivering application images for the containers managed by the container manger 602 to the other helping IaaS platform.

Figure 12:
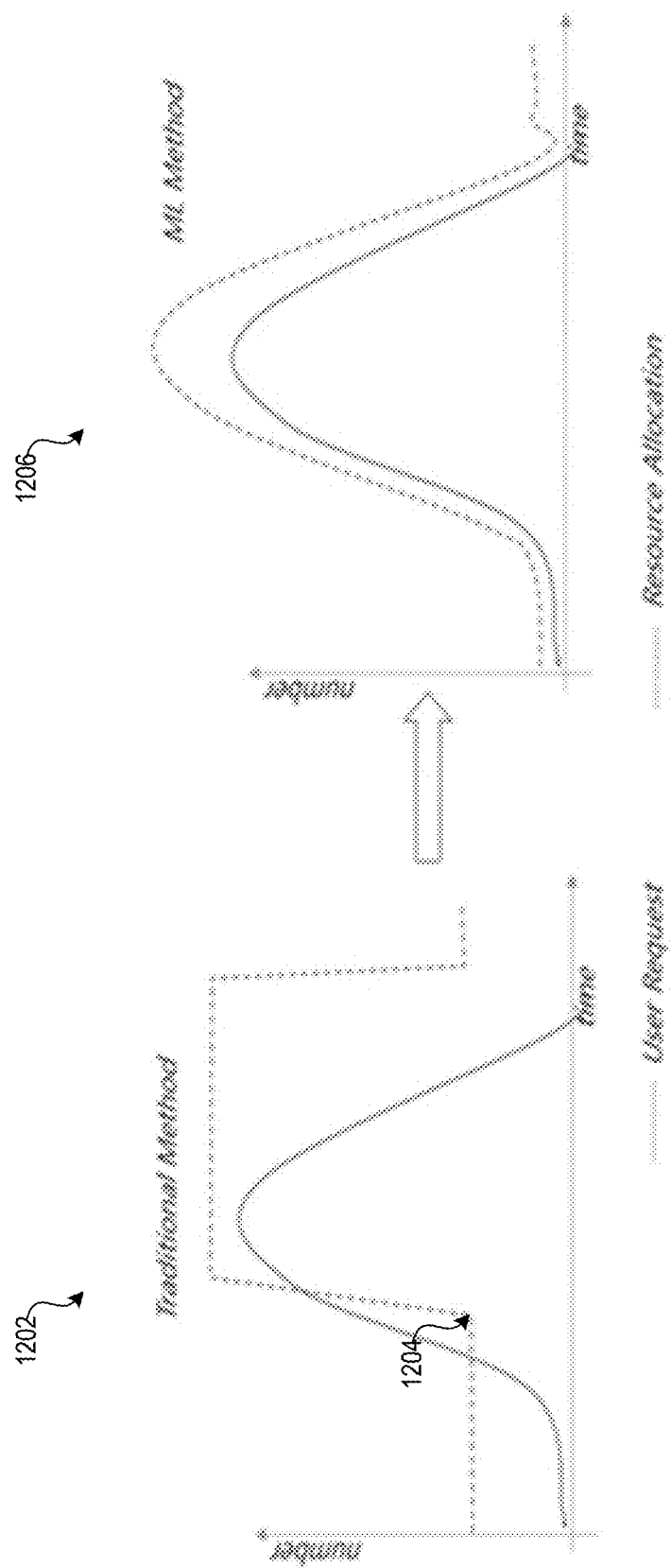
FIG. 12 illustrates a comparison of resource allocation for containers between predictive and dynamic allocation based on a model developed using machine learning algorithms and traditional reactive resource allocation approach.

The predictive resource allocation above for containers helps maintaining high QoS. FIG. 12 illustrate a comparison between the implementation above and traditional post-problem solution in terms of the how the actual number of user requests matches resource allocation as a function of time. The dotted lines represent resource allocation and the solid lines represent service volume (e.g., number of user requests). As shown by 1202 of FIG. 12, the traditional post-problem solution, for example, increase allocation of resources at time 1204 when it detects that the existing allocation is not adequate to support the service requests. Thus, QoS has already been compromised before the resource allocation is increased. The predictive resource allocation, as illustrated by 1206, however, proactively predicts the resource requirement in future times and thus maintains a desired level of QoS.

Figure 13:
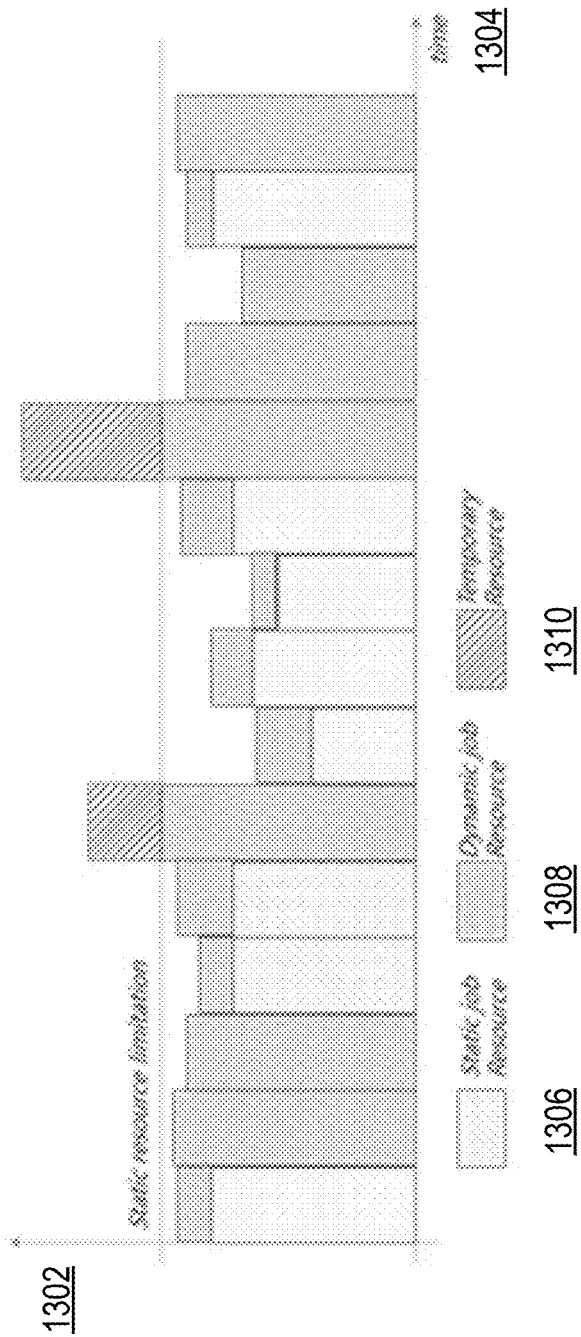
FIG. 13 illustrates an example of predictive dynamic resource allocation in a cluster of computers for an application with mixed characteristics.

In another implementation, a client application may handle, for example, two types of service. The first type of service may be dynamic and serves outside users. For example, the first type of service may be provided to outside users for online video streaming which usually comes in bursts and in random fashion. The second type of service may be static and regular and may be provided for internal system requests such as daily report generation. The two types of service may be identified and modeled separately. For example, resource requirement for the first type of service may be modeled based on the modified RFR algorithm described above for predicting resources needed for the dynamic service at a future time. The regular static service resource requirement data may be taken out of the training data for the modified RFR model to improve predictive accuracy and reduce overfitting. As shown in FIG. 13, the total resource allocation 1302 for the application as a function of time 1304 may include sufficient resources 1306 for the static service and resources 1308 for predicted amount of dynamic service. When total resource requirement that is unusually high is occasionally predicted, the scheduler may rely on temporary resource 1310 from public cloud to maintain QoS.

The methods, devices, processing, frameworks, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Various implementations have been specifically described. However, many other implementations are also possible.

What is claimed is:

1. A method comprising:
   maintaining separate historical runtime data for each of a plurality of service applications;
   receiving current runtime data for a container group comprising individual containers instantiated on current hardware resources, where:
      each container in the container group is configured to execute independently of other containers in the container group;
      each container comprises an instance of a service application among the plurality of service applications; and
      each container is allocated a subset of the current hardware resources;
   obtaining expanded runtime data for the service application by adding the current runtime data to the historical runtime data for the service application;
   predicting a resource requirement for the service application at a specific future time by executing a machine learning model, wherein the machine learning model is trained independently from other machine learning models trained for other service applications among the plurality of service applications, and wherein the machine learning model comprises a regression algorithm trained using a subset of the expanded historical runtime data for the service application selected according to the specific future time, the regression algorithm comprising a splitting threshold for a splitting feature optimized after adding a predefined tolerance value to the splitting feature;
   determining an updated resource allocation for the service application at the specific future time, the updated resource allocation comprising a number of containers to be instantiated and updated hardware resources to be allocated to each of the number of containers; and
   sending the updated resource allocation for the service application to a scheduler for implementation of the updated resource allocation at the specific future time.

2. The method of claim 1, where the current hardware resources comprise processor resources and memory resources.

3. The method of claim 1, where the current runtime data for the container group comprise hardware resource usage data and service volume data.

4. The method of claim 1, where the implementation of the updated resource allocation by the scheduler is confined within the current hardware resources.

5. The method of claim 1, where implementation of the updated resource allocation by the scheduler comprises temporarily allocating hardware resources outside the current hardware resources to the service application.

6. The method of claim 1, where the currently hardware resources comprises a cluster of computers and at least two containers of the container group of containers each runs on a separate computer of the cluster of computers.

7. The method of claim 1, where the regression algorithm comprises a random forest regression algorithm using a subset of the expanded historical runtime data for the service application selected according to the specific future time.

8. The method of claim 1, where each container comprises a software stack needing only a kernel of a host operating system in a computer and associated hardware to run.

9. A computer system, comprising:
- a communication interface;
- a memory comprising separate historical runtime data for each of a plurality of service applications; and
- circuitry in communication with the memory and the communication interface, the circuitry configured to:
  - receive, via the communication interface, current runtime data for a container group containing individual containers instantiated on current hardware resources, where:
    - each container in the container group is configured to execute independently of other containers in the container group;
    - each container comprises an instance of a service application among the plurality of service applications; and
    - each container is allocated a subset of the current hardware resources;
  - obtain expanded runtime data for the service application by adding the current runtime data to the historical runtime data for the service application;
  - predict a resource requirement for the service application at a specific future time by executing a machine learning model, wherein the machine learning model for the service application is trained independently from other machine learning models trained for other service applications among the plurality of service applications, and where the machine learning model comprises a regression algorithm trained using a subset of the expanded historical runtime data for the service application selected according to the specific future time, the regression algorithm comprising a splitting threshold for a splitting feature optimized after adding a predefined tolerance value to the splitting feature;
  - determine an updated resource allocation for the service application at the specific future time, the updated resource allocation comprising a number of containers to be instantiated and updated hardware resources to be allocated to each of the number of containers; and
  - send the updated resource allocation for the service application to a scheduler for implementation of the updated resource allocation at the specific future time.

10. The computer system of claim 9, where the current hardware resources comprise processor resources and memory resources.

11. The computer system of claim 9, where the current runtime data for the container group comprise hardware resource usage data and service volume data.

12. The computer system of claim 9, where the implementation of the updated resource allocation by the scheduler is confined within the current hardware resources.

13. The computer system of claim 9, where implementation of the updated resource allocation by the scheduler comprises temporarily allocating hardware resources outside the current hardware resources to the service application.

14. The computer system of claim 9, where the currently hardware resources comprises a cluster of computers and at least two containers of the container group of containers each runs on a separate computer of the cluster of computers.

15. The computer system of claim 9, where the regression algorithm comprises a random forest regression algorithm using the subset of the expanded historical runtime data for the service application selected according to the specific future time.

16. A computing system, comprising:
- a set of current hardware resources;
- an allocator computer comprising a memory comprising separate historical runtime data of each of a plurality of service applications; and
- a scheduler,
- where the set of current hardware resources, the allocator computer, and the scheduler are in communication with one another;
- where a service application among the plurality of service applications comprises a container group allocated a subset of the current hardware resources and comprising at least one independently instantiated container; and
- where the allocator computer is configured to:
  - receive current runtime data for the service application from the set of current hardware resources;
  - obtain expanded runtime data for the service application by adding the current runtime data to the historical runtime data for the service application;
  - predict a resource requirement for the service application at a specific future time by executing a machine learning model, wherein the machine learning model is trained independently from other machine learning models trained for other service applications among the plurality of service applications, and where the machine learning model comprises a regression algorithm trained using a subset of the expanded historical runtime data for the service application selected according to the specific future time, the regression algorithm comprising a splitting threshold for a splitting feature optimized after adding a predefined tolerance value to the splitting feature;
  - determine an updated resource allocation for the service application at the specific future time, the updated resource allocation comprising a number of containers to be instantiated and updated hardware resources to be allocated to each of the number of containers; and
  - send the updated resource allocation for the service application to a scheduler for implementation of the updated resource allocation at the specific future time.

* * * * *

UNITED STATES PATENT AND TRADEMARK OFFICE
CERTIFICATE OF CORRECTION

PATENT NO. : 10,942,776 B2  
APPLICATION NO. : 16/334907  
DATED : March 9, 2021  
INVENTOR(S) : Guo Ma et al.

Page 1 of 1

It is certified that error appears in the above-identified patent and that said Letters Patent is hereby corrected as shown below:

On the Title Page

Item (56), above CN 102004671 A 4/2011, delete "CN 102004671 A 4/2011".

In the Specification

Column 8, Line 35, delete "overfilling" and insert -- overfitting --.

Signed and Sealed this  
Twentieth Day of April, 2021

Drew Hirshfeld  
*Performing the Functions and Duties of the  
Under Secretary of Commerce for Intellectual Property and  
Director of the United States Patent and Trademark Office*